United States Patent
Onoguchi et al.

[19]

[11] Patent Number: 6,139,893

[45] Date of Patent: Oct. 31, 2000

[54] METHOD FOR MANUFACTURING RAISED-BRIM PRODUCTS

[75] Inventors: Kazuyoshi Onoguchi; Yasunori Tashiro, both of Tochigi-ken, Japan

[73] Assignee: Rheon Automatic Machinery Co., Ltd., Japan

[21] Appl. No.: 09/258,026

[22] Filed: Feb. 25, 1999

Related U.S. Application Data

[62] Division of application No. 08/908,731, Aug. 7, 1997, Pat. No. 5,916,601.

[30] Foreign Application Priority Data

Aug. 8, 1996 [JP] Japan .................................. 8-227655

[51] Int. Cl.⁷ .................................................. A21C 11/00
[52] U.S. Cl. ........................ 426/503; 426/283; 426/516; 426/518
[58] Field of Search .................... 426/283, 512, 426/516, 517, 518, 503

[56] References Cited

U.S. PATENT DOCUMENTS

| | | | | |
|---|---|---|---|---|
| 4,251,201 | 2/1981 | Krysiak | ................................... | 425/132 |
| 4,659,580 | 4/1987 | Svengren | ................................... | 425/132 |
| 4,734,024 | 3/1988 | Tashiro | ................................... | 426/516 |
| 4,767,304 | 8/1988 | Tashiro | ................................... | 425/308 |
| 4,767,305 | 8/1988 | Tashiro | ................................... | 425/308 |
| 5,031,520 | 7/1991 | Tsay | ................................... | 99/537 |
| 5,098,273 | 3/1992 | Tashiro | ................................... | 425/308 |
| 5,223,277 | 6/1993 | Watanabe et al. | ................................... | 425/132 |
| 5,290,577 | 3/1994 | Tashiro | ................................... | 426/503 |
| 5,518,391 | 5/1996 | Tashiro | ................................... | 425/308 |
| 5,558,896 | 9/1996 | Kobayashi | ................................... | 425/308 |
| 5,916,601 | 6/1999 | Onoguchi et al. | ................................... | 425/132 |

FOREIGN PATENT DOCUMENTS

60-85178  6/1985  Japan .................................. 425/308

*Primary Examiner*—Gabrielle Brouillette
*Assistant Examiner*—Hao Mai
*Attorney, Agent, or Firm*—Brinks Hofer Gilson & Lione

[57] ABSTRACT

A simple method and apparatus is provided for manufacturing raised-brim products in which the end of a continuous bar-shaped dough body is fed into an opening surrounded by a plurality of movable cutting members. The bar-shaped dough body includes a filling material enclosed within a cylindrical dough sheet. Each of the cutting members includes a slanted inner surface and a lower surface which meet at an acute angle to form an edge, and the lower surface includes a concave groove located adjacent to and extending along the edge. The cutting members are cooperatively moved such that the edges of the plurality of cutting members cut the bar-shaped dough body to form a separated portion which includes filling material exposed on an upper surface thereof, and such that the slanted inner surface pulls the dough sheet to close the cut end of the bar-shaped dough body.

4 Claims, 10 Drawing Sheets

METHOD FOR MANUFACTURING RAISED-BRIM PRODUCTS

This application is a division of application Ser. No. 08/908,731, filed Aug. 7, 1997, now U.S. Pat. No. 5,916,601.

BACKGROUND OF THE INVENTION

1. Field of the Invention

This invention relates to a method and apparatus for manufacturing raised-brim products, such as pizza, apple pie, or tart cake, and also to a cutting member which enables known apparatus used for manufacturing filled products, such as bean-jam buns, filling-containing dumplings, etc., to readily form raised-brim products.

2. Description of the Prior Art

Pizza is a very popular raised-brim product because of its appealing taste and shapely appearance. Pizza is typically made by covering a circular pizza dough sheet, whose peripheral edge is pinched or folded to form a raised brim, with toppings, such as tomatoes, cheese, ham, mushrooms, sliced onions, and baking it in an oven.

Until very recently pizzas have been produced manually. However, the popularity of pizza and recent developments in frozen-food preservation techniques have helped promote the mechanized mass-production of pizza.

The conventional method for mechanized pizza production consists of two steps, namely, forming a dough sheet, and then covering the dough sheet with toppings. In a conventional apparatus for making a raised-brim pizza, the step of forming a dough sheet is performed by stamping an appropriately-sized dough ball or a properly-shaped dough sheet, and then processing the dough sheet to form a dough base with a raised brim. Subsequently, the step of covering the inside of the raised-brim dough base with various kinds of toppings or fillings is performed.

The conventional apparatus mentioned above merely automates the two steps of the manual manufacturing process, and requires numerous sub-steps to form the raised-brim pizza dough base. As a result, the conventional apparatus must utilize large-scale machinery.

Similar problems arise in the mechanized mass-production of other raised-brim products, such as apple pies or tarts. In particular, many steps are required to form pie dough or tart dough, both of which containing oils and fats and being viscoelastic, into a raised-brim base by hand or by mechanical molds, and then in pouring fillings, such as apple slices or cream, etc. into the hollow of the raised-brim base.

SUMMARY OF THE INVENTION

An object of the present invention is to provide a method and apparatus for making raised-brim products which avoids the numerous sub-steps of the large-scale conventional method and apparatus, which merely perform corresponding sub-steps of the manual process.

A method of manufacturing a raised-brim product in accordance with the present invention includes the steps of feeding an end of a continuous bar-shaped dough body into an opening surrounded by a plurality of movable cutting members, and moving the plurality of cutting members such that the plurality of cutting members cut the bar-shaped dough body to form a separated portion. The bar-shaped dough body including a filling material enclosed within a cylindrical dough sheet, and each of the cutting members includes a slanted inner surface and a lower surface which meet at an acute angle to form an edge, and a groove formed in the lower surface which is located adjacent to and extends along the edge. In accordance with this method, as the separated portion is cut, the upper edge of the dough sheet is separated from the cutting members due to the presence of the groove, thereby reliably forming a raised-brim product with filling material exposed on an upper surface thereof. In addition, the slanted inner surfaces of the cutting members pull the dough sheet to close the cut end of the bar-shaped dough body, thereby facilitating a repeatable, simplified mechanized process for forming raised-brim products.

In accordance with one aspect of the present invention, an apparatus for manufacturing a raised-brim product includes a housing, a plurality of polyhedral cutting members disposed in the housing, and a mechanism for feeding a bar-shaped dough body into an opening formed by the cutting members. The housing defines an opening and includes sliding surfaces formed on a periphery of the opening. The cutting members are disposed on the housing such that the cutting members synchronously slide along the sliding surfaces of the housing to open and close the opening. Each cutting member includes an upper surface and a lower surface, a slanted inner surface which intersects the lower surface at an acute angle to form an edge, and an elongated groove formed in the lower surface and extending along the edge. In one embodiment, the slanted inner surface extends from the edge to the upper surface, and intersects the upper surface at an obtuse angle. In another embodiment, a pressing portion extends between the slanted inner surface and the upper surface, the pressing portion including a pressing surface which is substantially perpendicular to the upper and lower surfaces. These embodiments facilitate production of raised-brim products using different types of dough material, wherein the pressing portion facilitates production of raised-brim products using dough material having a relatively higher viscoelasticity.

In accordance with a second aspect of the present invention, an apparatus for manufacturing a raised-brim product includes a plurality of cutting members pivotally connected by fulcrums equidistantly disposed in a circular pattern around an opening such that the opening is opened and closed by synchronized pivoting of the plurality of cutting members. Each of the cutting members includes parallel upper and lower surfaces, a slanted inner surface which intersects the lower surface at an acute angle to form an edge, and an elongated groove formed in the lower surface and extending along the edge.

BRIEF DESCRIPTION OF THE DRAWINGS

FIGS. 19(a)–9(e) are sectional side views illustrating a production process in accordance with the third embodiment.

DESCRIPTION OF THE PREFERRED EMBODIMENTS

A first embodiment of the present invention is described below with reference to FIGS. 1–8.

Figure 6:
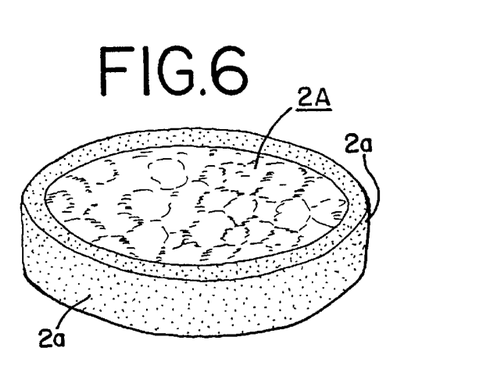
FIG. 6 is a perspective view of a raised-brim product produced in accordance with the present invention.

FIG. 6 shows a raised-brim product 2A formed in accordance with the present invention. As used herein, the term "raised-brim product" refers to an article having a dough-like base, a raised brim 2a surrounding the base, and an open top through which toppings or fillings are exposed.

Figure 3:
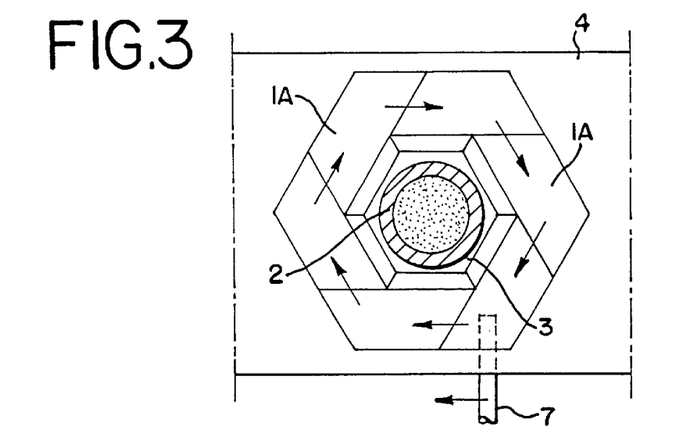
FIG. 3 is a top view showing an apparatus in accordance with the first embodiment of the present invention with the cutting members in an opened position.
Figure 4:
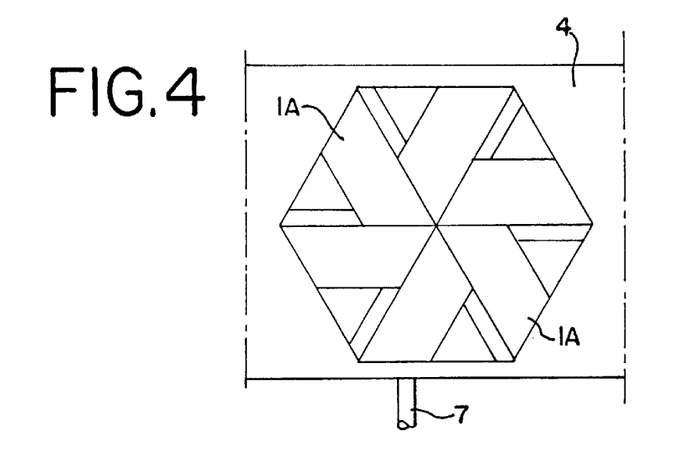
FIG. 4 is a top view showing the apparatus of FIG. 3 with the cutting members in a closed position.

Referring to FIG. 3, an apparatus for mechanically producing raised-brim products 2A in accordance with the first embodiment includes a housing 4 having an opening 3 surrounded by sliding surfaces (not shown), and six polyhedral cutting members 1A connected to the housing 4 such that the cutting members 1A form a ring around the opening 3 and synchronously slide along the sliding surfaces of the housing 4 in response to a driving force supplied by a driving mechanism (not shown). In particular, the driving force supplied from the driving mechanism, which reciprocates over a fixed distance, is applied to one of the cutting members 1A via a rod 7. This driving force pushes the cutting member 1A in a first direction along the sliding surface (i.e., to the left in FIG. 3). Movement of the driven cutting member 1A is transmitted to the remaining cutting members 1A, thereby forcing the remaining cutting members to slide along their respective sliding surfaces in first directions. As shown in FIG. 4, when the driven cutting member 1A is driven fully to the end of the sliding surface, the six cutting members 1A close the opening 3. Subsequently, the driving mechanism applies a reciprocal driving force such that the driven cutting member 1A slides in a second direction (i.e., to the right in FIG. 3), thereby causing the cutting members 1A to reopen the opening 3.

To prevent the cutting members 1A from being forced out of the housing 4 when driven to open and close the opening 3, a lid (not shown) may be disposed above the cutting members 1A. Such a lid must be formed such that both the passage of the bar-shaped dough body 2 through the opening 3, and the opening and closing movements of the cutting members 1A are unimpeded.

Referring again to FIG. 3, a mechanism (not shown) feeds a continuous bar-shaped dough body 2 into the opening 3 when the cutting members 1A are in the opened position. The bar-shaped dough body 2 includes filling materials, such as vegetables, cheese, ham, etc., which are enveloped within a cylindrical dough sheet, such as pizza dough. In one embodiment, the bar-shaped dough body 2 is produced by discharging the filling materials through a double nozzle (a nozzle for forming a coaxial double-layered bar) using a discharge mechanism, such as a vane pump, into the cylindrical dough sheet. Other manufacturing method known to those in the art may be adopted according to the amount and size, etc., of the bar shaped dough body to be produced.

Figure 1:
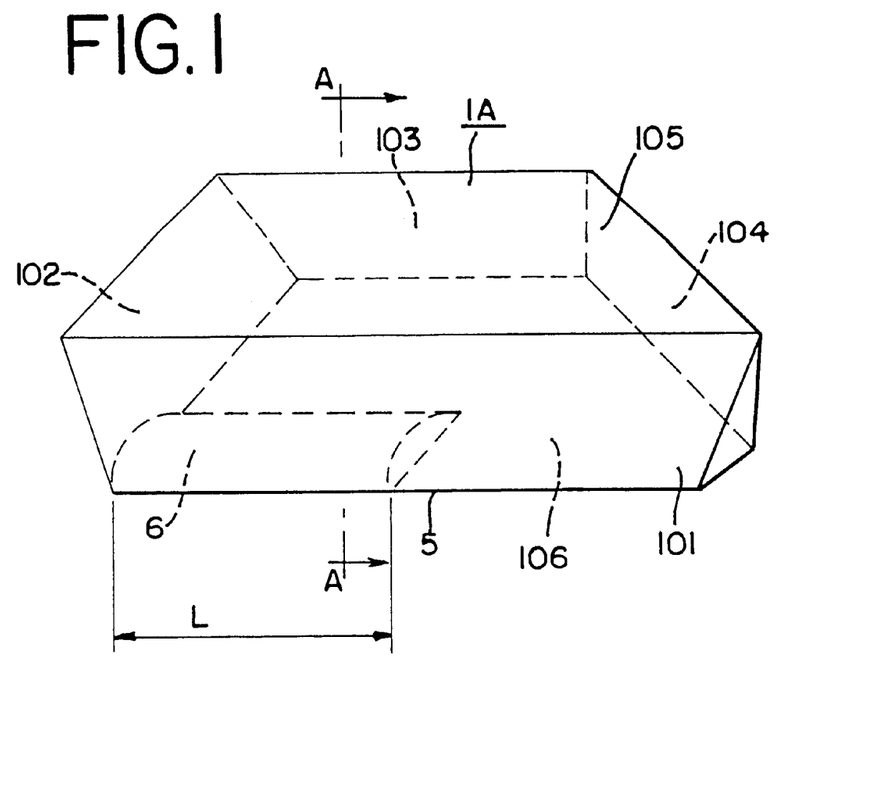
FIG. 1 is a perspective view of a cutting member according to a first embodiment of the present invention.
Figure 2:
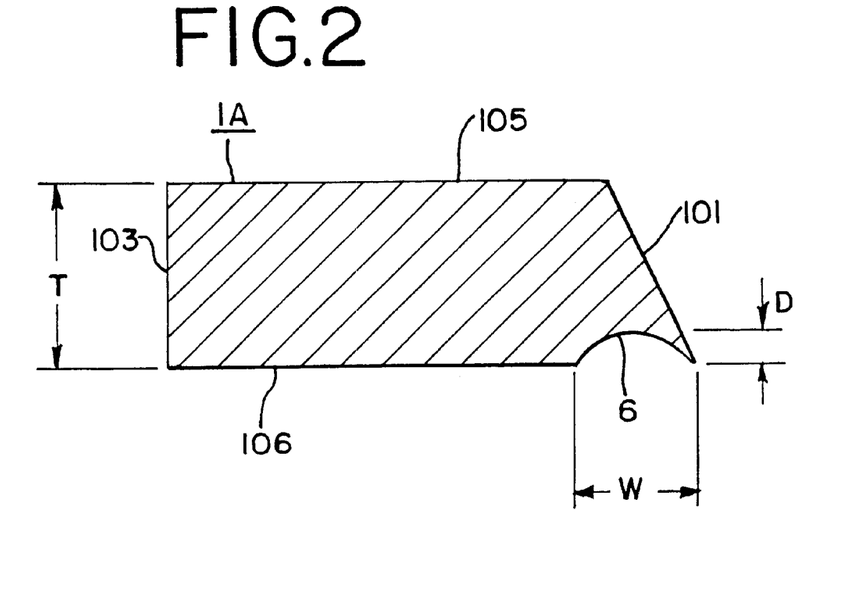
FIG. 2 is a sectional view of the cutting member taken along section line 2—2 of FIG. 1.

FIGS. 1 and 2 are perspective and sectional views of the polyhedral cutting member 1A in accordance with the first embodiment. Each cutting member 1A is formed from a metal block and includes first and second inner surfaces 101 and 102, first and second outer surfaces 103 and 104, an upper surface 105 and a lower surface 106. The upper surface 105 and the lower surface 106 are flat and form parallel planes which are separated by a thickness T. When assembled in the housing 4, the first and second inner surfaces 101 and 102 of each cutting member 1 A abut the second and first inner surfaces 102 and 101, respectively, of an adjacent cutting member 1A. Similarly, the outer surfaces 103 and 104 of each cutting member 1A slide on the sliding surfaces of the housing 4. The first inner surface 101 is flat and slanted relative to the upper surface 105 and lower surface 106 such that intersects the upper surface 105 at an obtuse angle, and it also intersects the lower surface 106 at an acute angle. An edge 5 is formed by the intersection of the first inner surface 101 and the lower surface 106. As shown in FIG. 1, a corner formed by the first inner surface 101, the outer surface 104 and the lower surface 106 is cut so that, as shown in FIG. 4, when the cutting members 1A are in the closed position, the cut corner is snugly fitted against the inner surface of the housing 4.

Figure 5:
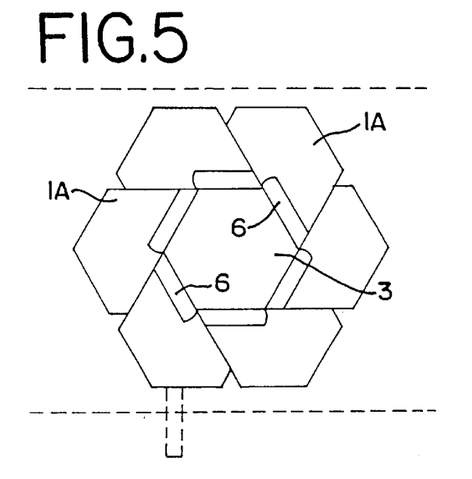
FIG. 5 is a bottom view of the apparatus of the first embodiment.

In accordance with the present invention, an elongated groove 6, whose width, depth, and length are W, D, and L, respectively, is formed in the lower surface 106. The groove 6 is adjacent to and extends along a portion of the edge 5. The groove 6 is, e.g., substantially a semi-cylinder whose width W is preferably greater than the thickness of the cylindrical dough sheet of the continuous bar-shaped dough body 2. Alternatively, the groove 6 can be formed as a concave surface of any shape, provided enough clearance is provided to prevent the cut bar-shaped dough body 2 from contacting the lower surface 106 of each cutting member 1A, as discussed below. FIG. 5 is a bottom view of the apparatus shown in FIG. 3, which shows that when the cutting members 1A are assembled, the grooves 6 are aligned along the portion of the cutting members 1A which surrounds the opening 3.

The method of producing raised-brim products 2A in accordance with the first embodiment of the present invention will now be described with reference to FIGS. 7(a) to 7(e).

Figure 7A:
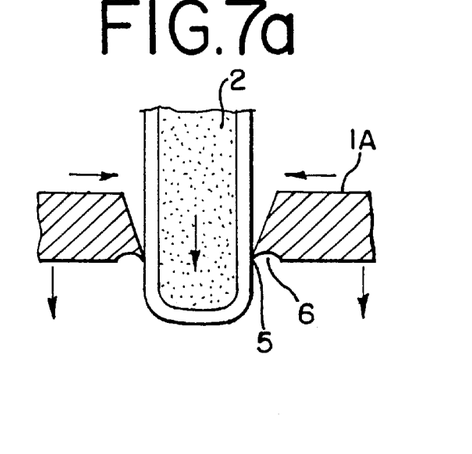
FIGS. 7(a)–7(e) are simplified sectional side views illustrating a production process in accordance with the first embodiment.

As shown in FIG. 7(a), the closed end of the bar-shaped dough body 2 is fed (downward) into the opening 3 between the cutting members 1A such that a predetermined portion of the bar-shaped dough body extends through the opening 3.

Figure 7B:
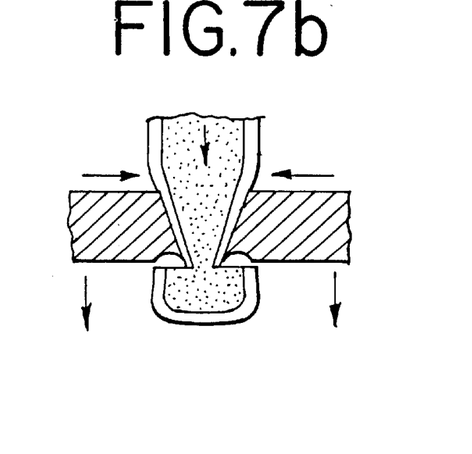

Next, as shown in FIG. 7(b), the driving mechanism slides the driven cutting member 1A (e.g., to the left in FIG. 3) such that the cutting members 1A being to close the opening 3 and the edges 5 move toward the bar-shaped dough body 2. As the cutting members 1A press against the bar-shaped dough body 2, the edges 5 of the cutting members 1A cut the cylindrical dough sheet, and penetrated the filling. This step shows the essential functions and effects of the present invention in that the edge 5 cuts the viscoelastic dough material, and the slanted inner surface 101 gradually pushes the dough material toward the center as the edge 5 penetrates into the bar-shaped dough body. During this process the groove 6, provided along the edge 5 on the lower surface 106, provides a clearance between the upper periphery of the cut dough sheet, thereby eliminating any contact of the bar-shaped dough body 2 with the lower surface 106 of the cutting members 1A. That is, if no groove 6 is provided along the edge portion 5, then the viscoelasticity of the dough material would cause the dough sheet to adhere to the lower surface 106, and the upper periphery of the dough sheet would move toward the center. This would prevent effective formation of raised-brim products.

Figure 7C:
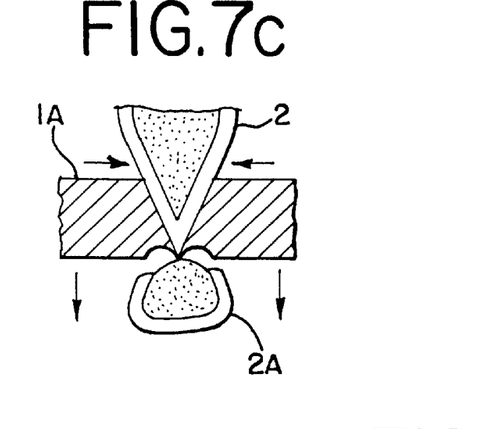

FIG. 7(c) shows the cutting members as the inner tips of the edges 5 meet at the center of the opening 3, thereby completely closing the opening 3 and separating a raised-brim product 2A from the bar-shaped dough body 2.

Figure 7D:
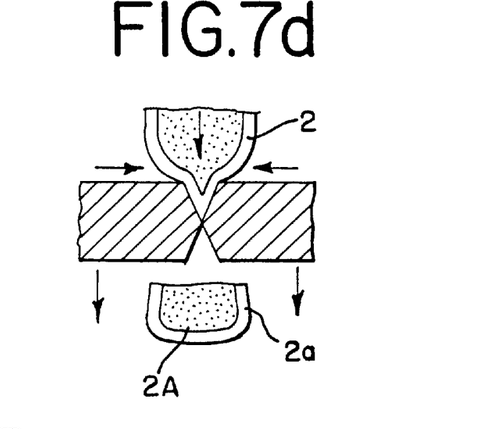

As shown in FIG. 7(d), the cutting members 1A further slide relative to each other such that the slanted inner surface 101 pushes the dough material of the bar-shaped dough body inward and upward. This action gathers (closes) the end of the cut surface of the bar-shaped dough body, and, as the dough material slides along the slanted inner surface 101, re-forms the closed end of the bar-shaped dough body 2. That is, even in the state shown in FIG. 7(c), the dough material at the lower end of the bar-shaped dough body (above the cutting members 1A) has already been gathered and cut. However, depending on the properties of the dough material, the cut end may not be completely closed. If the cutting members 1A are subsequently opened with the end of the bar-shaped dough body in such a state, the cut end will open, thereby interrupting production because of the incomplete formation of the dough on the lower side of the product 2A. The above-mentioned process (FIG. 7(d)) is thus provided to effectively close the cut end of the bar-shaped dough body, and to effectively move the dough upward by pressing the dough with the slanted inner surface 101. Accordingly, any desired effect commensurate with the properties of the dough sheet can be achieved by adjusting the angle of inclination of the slanted inner surface 101.

Figure 7E:
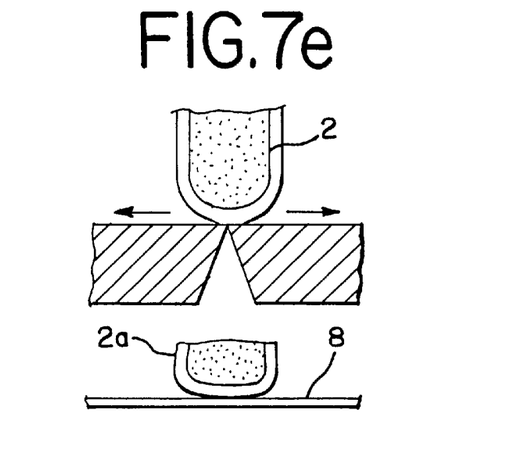

FIG. 7(e) shows a state wherein the cutting members 1A are fully closed, as also shown in FIG. 4. In this closed position, the upper surface 105 of the cutting members 1A meet at the center of the opening 3, and the slanted inner surface 101 is located entirely below the cut/closed end of the bar-shaped dough body 2. After the cut/closed end of the bar-shaped dough body 2 has been neatly formed by effectively forming and effectively moving the dough sheet using the slanted inner surfaces 101, the cutting members 1A are driven in a second directed such that they return to the open position shown in FIG. 7(a).

Preferably, the feed rate of the bar-shaped dough body 2 is appropriately adjustable at any time according to processing conditions, such as the properties of the dough material of the bar-shaped dough body 2 and the produced amounts of raised-brim products 2A. This feed rate adjustment can be carried out by supplying the dough body 2 at a variable speed or in an intermittent manner, and by adjusting the up-and-down movements of the housing 4 in synchronism with the opening and closing of the cutting members 1A. For example, if a large diameter bar-shaped dough body is supplied or a flatter raised-brim product is desired, the process can be carried out by moving cutting members 1A outward in the same horizontal plane, while the cut-and-formed product is sandwiched between the cutting members 1A and a receiving conveyor 8 (see FIG. 7(e)). The steps of this modified method are shown in FIGS. 8(a) to 8(c).

Figure 8A:
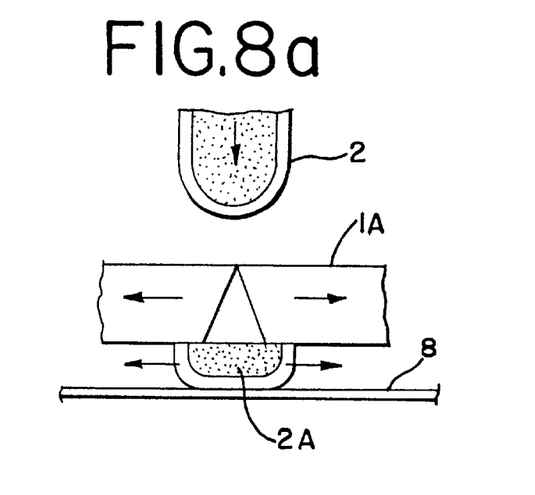
FIGS. 8(a)–8(c) are simplified sectional side views illustrating optional steps associated with the production process of the first embodiment.

FIG. 8(a) shows a first alternative step (which is performed after the step shown in FIG. 7(e)) wherein the housing 4 (not shown) is moved downward toward the receiving conveyor 8 (or, conversely, the conveyor 8 is moved upward toward the housing 4), thereby sandwiching the raised-brim product 2A between the cutting members 1A and the receiving conveyor 8. In this state, the dough material around the periphery of the product 2A contacts the lower surface 106 of the cutting members 1A. The pressure exerted on the sandwiched material is determined according to the desired shape of the raised-brim product and its quality. As the cutting members 1A open, a radial force is exerted on the dough material touching the lower surface 106.

Figure 8B:
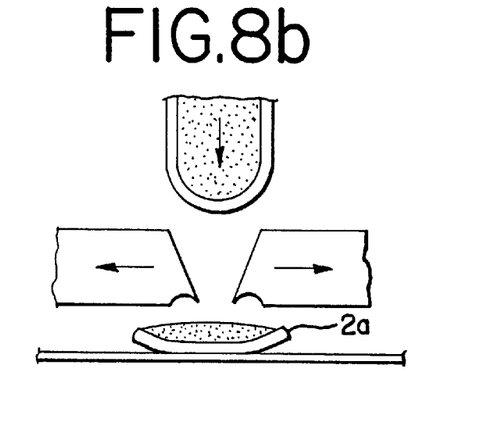

FIG. 8(b) shows a state wherein the cutting members 1A are opening, and the raised-brim product 2A is subjected to a radial force by the lower surface 106 of the cutting members 1A, thereby further flattening the raised-brim product 2A.

Figure 8C:
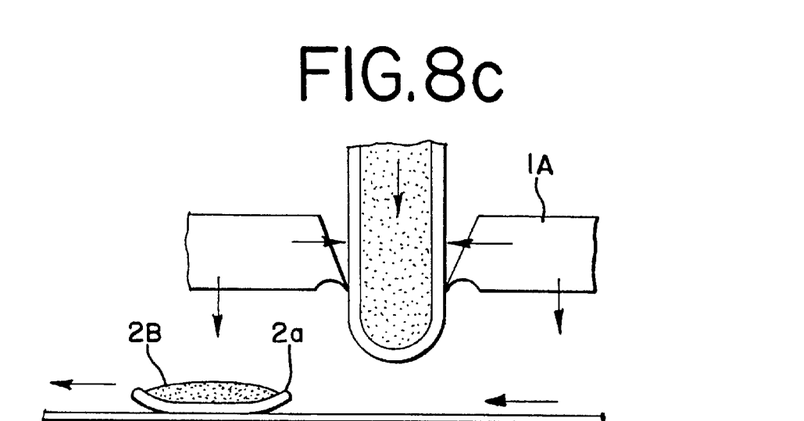

FIG. 8(c) shows the process of feeding the bar-shaped dough body 2 and closing the cutting members, thereby starting a subsequent cutting/forming process. The previously-formed raised-brim product with the topping or filling 2B exposed thereon and surrounded by the raised-brim 2a is then intermittently conveyed by the receiving conveyor 8 to a next production step.

The alternative process disclosed in FIGS. 8(a) to 8(c) makes it possible to manufacture a raised-brim product which is similar to a flat-shaped product such as conventional pizza with a raised edge, by using a manufacturing method which is quite different from and much simpler than the conventional one that has been previously used.

Figure 9:
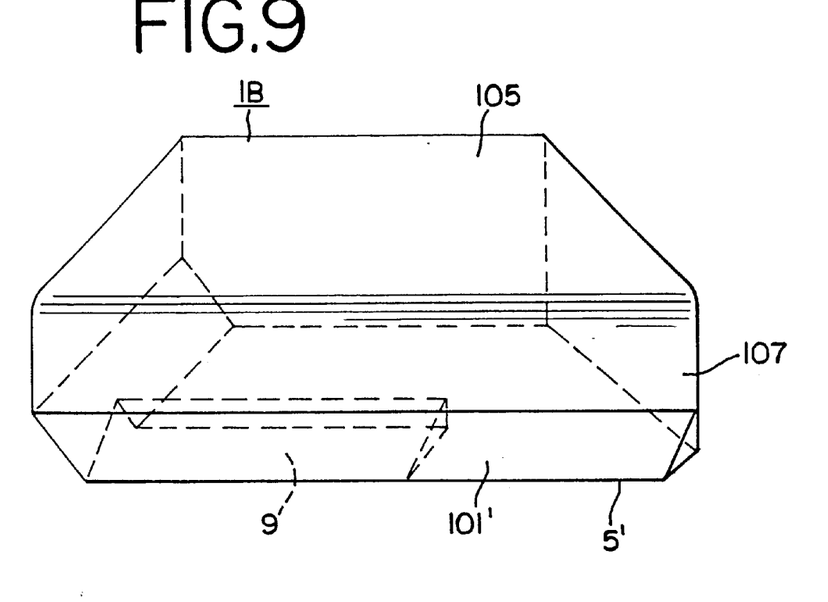
FIG. 9 is a perspective view of a cutting member in accordance with a second embodiment of the present invention.
Figure 10:
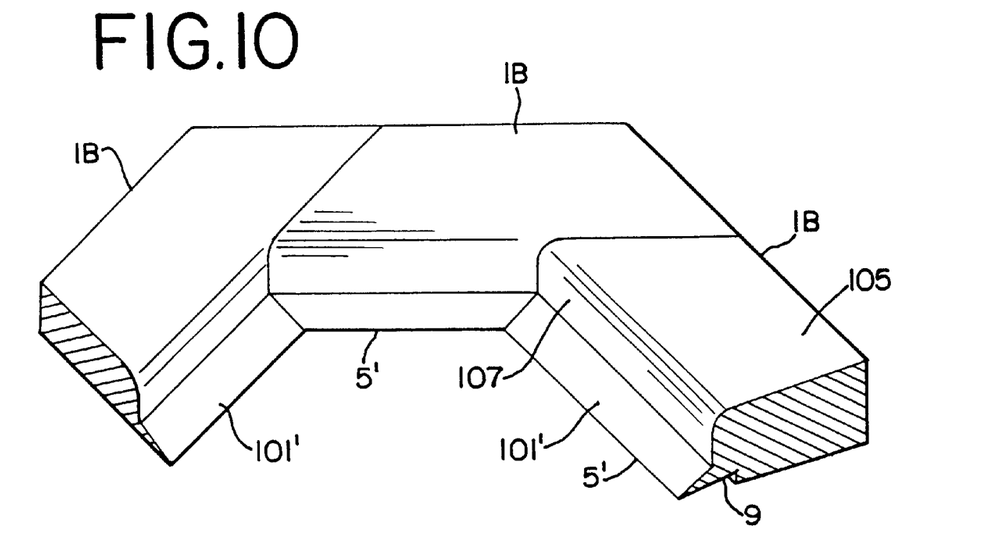
FIG. 10 is a perspective view showing a partial assembly of the cutting members of the second embodiment.

A second embodiment of this invention will now be described by reference to FIGS. 9–11. Components similar to those discussed in the first embodiment are designated by like reference numbers, and a description of these similar components is omitted.

In accordance with the second embodiment, a cutting member 1B has an edge 5' which is much sharper than that of the cutting member 1A of the first embodiment. Each cutting member 1B has a substantially vertical pressing surface 107 provided between a slanted inner surface 101' and the upper surface 105. The pressing surface 107 is necessary for an enveloping action (to be explained below), and the thickness of the pressing surface 107 is preferably determined according to the properties of the dough material of the bar-shaped dough body 2. The portion of the cutting member 1B where the upper surface 105 and pressing surface 107 meet is rounded to reduce resistance generated when the pressing surface 107 contacts the bar-shaped dough body 2. A groove or hollow 9, the depth of which gradually increases from the edge 5' in the width direction, and which has a given length and area, is formed in the lower surface of the cutting member 1B, and prevents the lower surface from contacting the bar-shaped dough body during the cutting process.

Figure 11A:
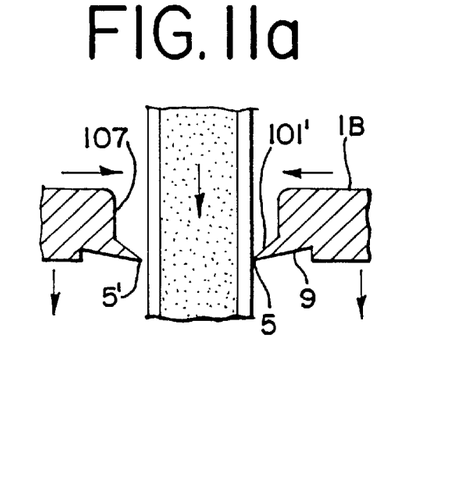
FIGS. 11(a)–11(e) are simplified sectional side views illustrating a production process in accordance with the second embodiment.
Figure 11B:
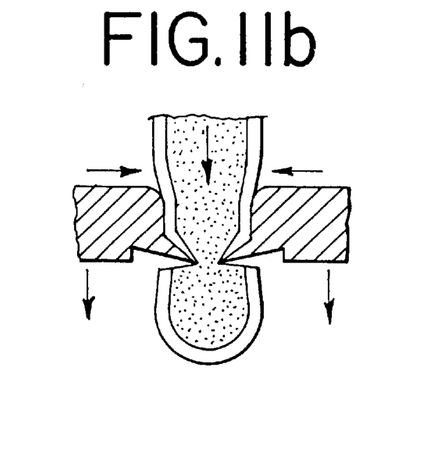
Figure 11C:
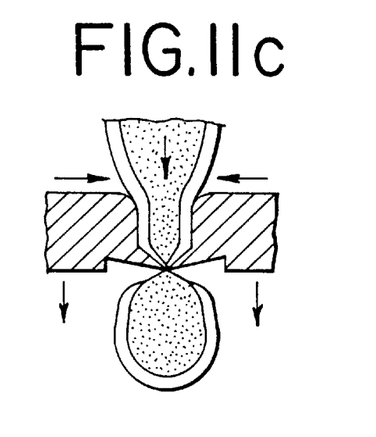
Figure 11D:
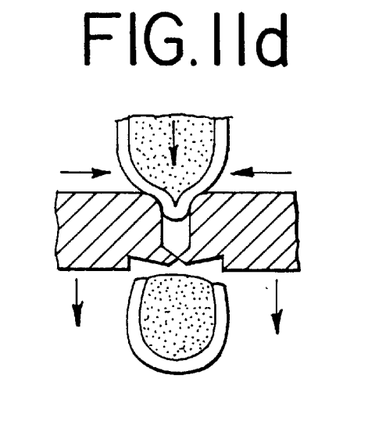
Figure 11E:
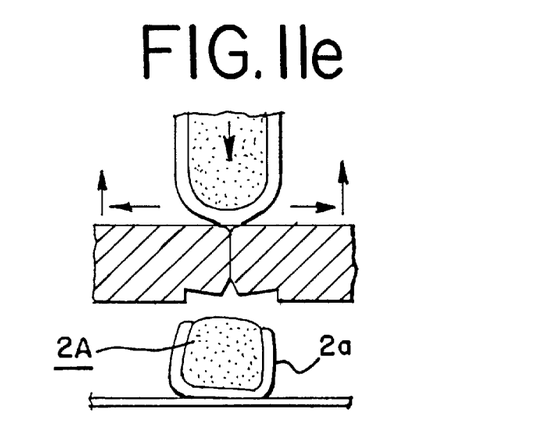

The effects and operations of the second embodiment will now be described with reference to FIGS. 9–11. To process dough having a relatively stronger viscoelasticity, the cutting member 1B is adapted such that a hollow 9 is provided on the lower surface 106 below a slanted inner surface 101', and such that a more acute (sharper) contact angle than that of the cutting member 1A is provided between the lower surface 106 and the slanted inner surface 101'. As can be seen from the change in the steps of the cutting processes shown in FIGS. 11(a) and 11(b), because the penetration angle of the edge 5' against the bar-shaped dough body 2 is almost vertical, the edge 5' smoothly penetrates the dough body 2 to more effectively cut it. However, the effect of closing the cut end of the bar-shaped dough body decreases in inverse proportion to the increase in the effect of cutting. That is, although the cut dough material of the bar-shaped dough body 2 is pressed and closed by the slanted end surface 101' (as shown in FIG. 11(c) to envelope the cut end of the bar-shaped dough body 2, the sharpened edge 5' itself does not effectively press-combine the cut edges of the dough material. To compensate for this reduced angle of the slanted inner surface 101', a very large edge portion 5' may be needed. This is unacceptable in view of the required cutting speed. This embodiment addresses this reduced press-constriction action by providing a supplemental pressing surface 107 formed above the slanted inner surface 101'. Because this embodiment can thus effectively cut and envelope dough material having a relatively higher viscoelasticity, it can be used to reliably manufacture cut and enveloped products even from a sticky dough material.

A third embodiment of this invention will now be described by reference to FIGS. 12–19. In the first and second embodiments the bar-shaped dough body 2 is cut by sliding reciprocation of the cutting members 1A, 1B in the housing 4. In contrast, according to the third embodiment, pivoting cutting members 1C are used, each of which having a fulcrum 13 which is connected to pivotal shafts equidistantly disposed on a mounting structure in a circular pattern.

Figure 12:
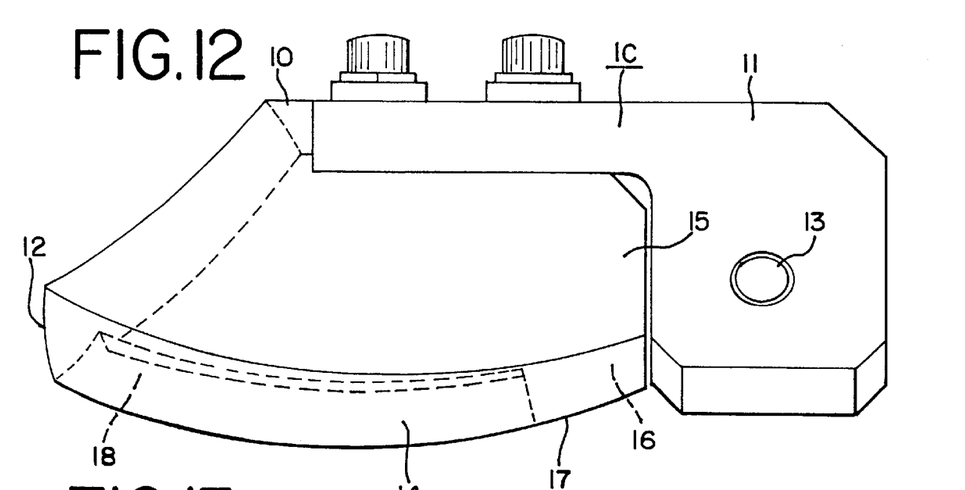
FIG. 12 is a perspective view of a cutting member in accordance with a third embodiment of the present invention.

The features of the cutting members 1C will now be described with reference to FIG. 12. Each cutting member 1C consists of a cutter portion 10 and a holder portion 11. The cutter portion 10 has a tip 12 at its free end. A slanted inner surface 14 extends from the tip 12 toward the fulcrum 13 which is located on the holder portion 11. Each cutting member 1C is fit in one of the pivotal shafts P which are equidistantly disposed on a mounting member (not shown) in a circular pattern (FIGS. 13 and 14) so as to place the cutter portion 10 on the same level.

The inner surface 14, which performs the enveloping or closing function in accordance with the present invention, is slanted such that it intersects an upper surface 15 of the cutter portion 10 at an obtuse angle, and intersects a lower surface 16 of the cutter portion 10 at an acute angle to form an elongated edge 17. A elongated groove or hollow 18, extending along the edge portion 17 over a certain length, is provided on the lower surface 16. The hollow 18 forms a concave surface which avoids contact with the bar-shaped dough body during the cutting process, and preferably has a width greater than the thickness of the dough material of the bar-shaped dough body 2, and preferably has a depth which increases in the width direction at a given angle.

Figure 16:
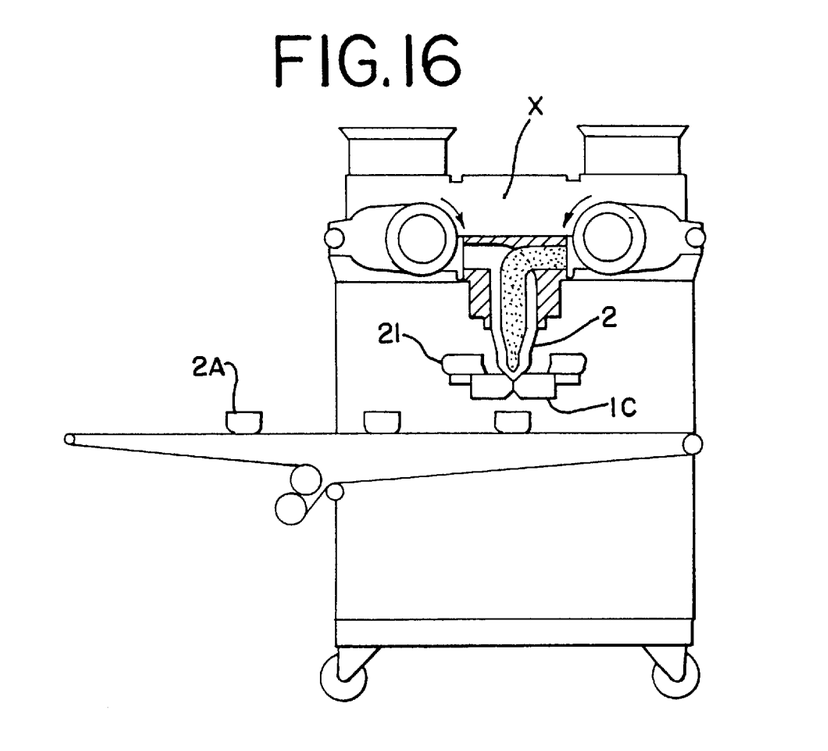
FIG. 16 is a front view showing the apparatus of the third embodiment.

In accordance with the third embodiment, a discharge mechanism X is provided for extruding food material in the continuous bar-shaped dough body 2, as shown in FIG. 16. The discharge mechanism X forms the continuous bar-shaped dough body 2 and feeds it into an enclosure 20, formed by six cutting members 1C, disposed below the discharge mechanism.

Figure 15:
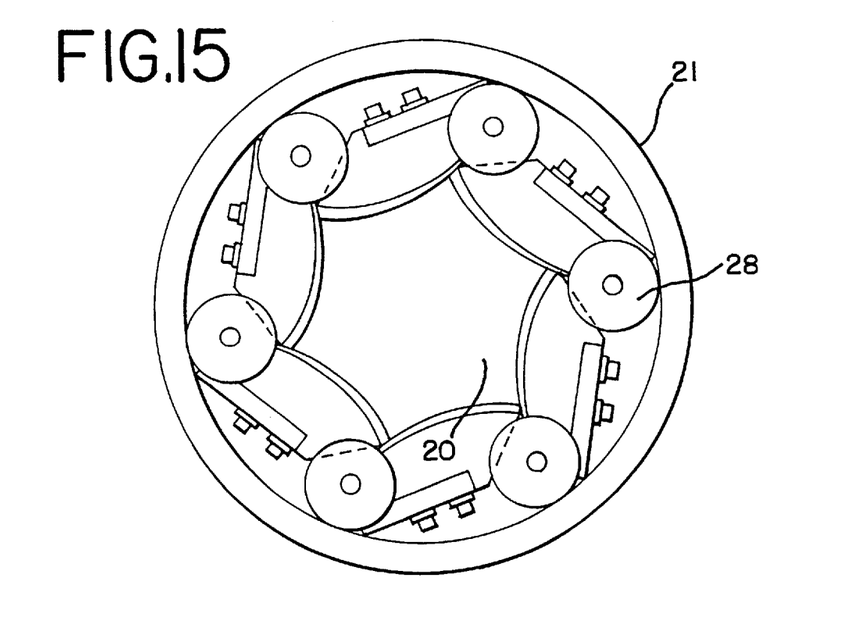
FIG. 15 is a top view showing a portion of an apparatus according to the third embodiment.
Figure 17:
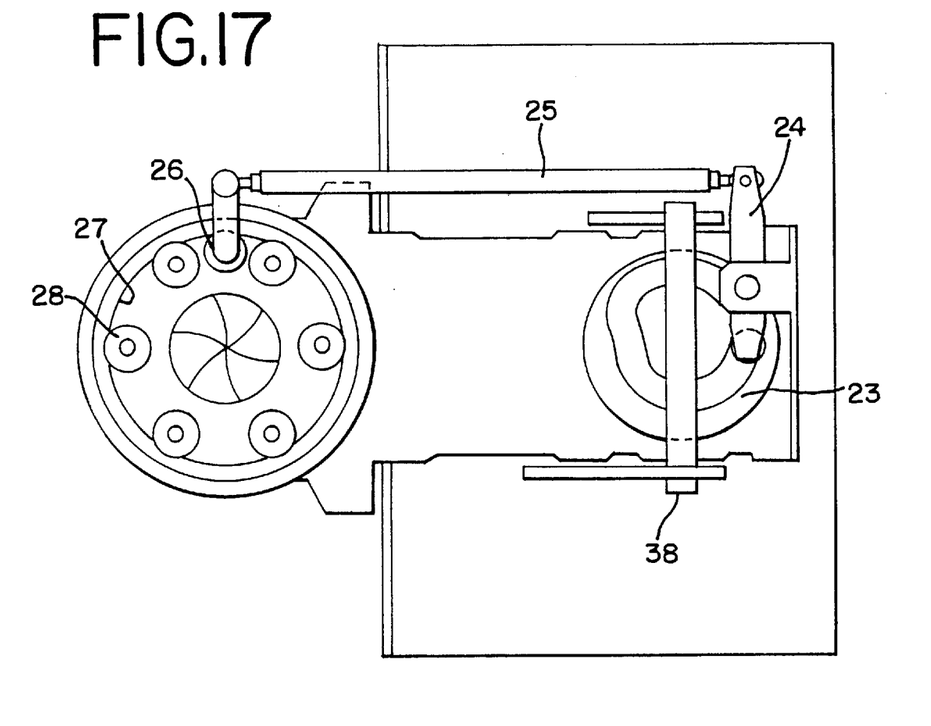
FIG. 17 is a top view showing a cutting member open/close mechanism utilized in the apparatus of the third embodiment.
Figure 18:
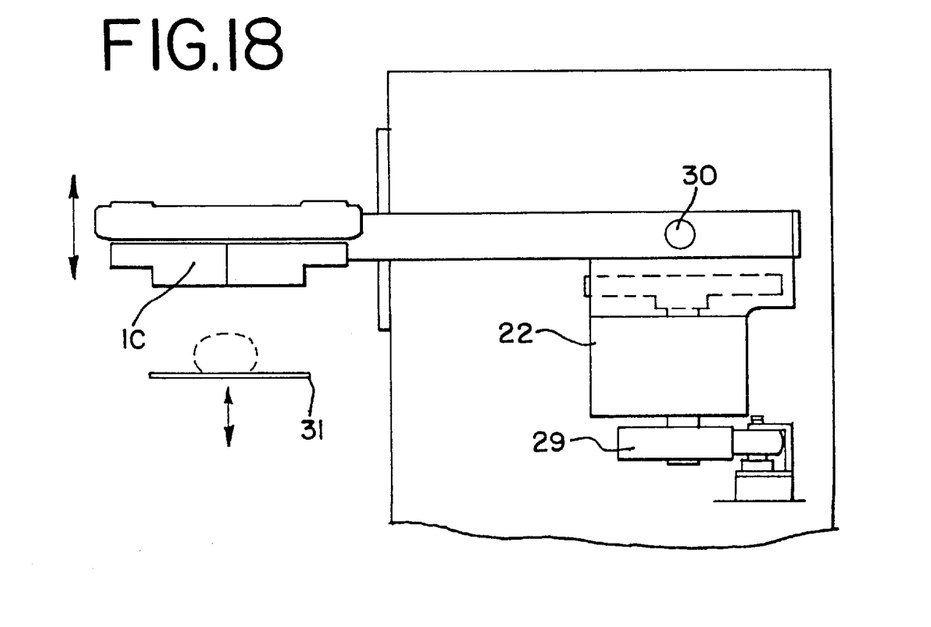
FIG. 18 is a side view also showing a cutting member raise/lower mechanism of the third embodiment.

FIGS. 15, 17, and 18 show a driving mechanism 21 for rotating the cutting members 1C in forward (counter-clockwise) and backward (clockwise) directions around the pivot shafts. The rotational movement of a motor 22 is transmitted to gears 27, 28 via a cam 23, an arm 24, a rod 25, and a gear 26, so that each cutting member 1C is synchronously rotated to cut and form the bar-shaped dough body 2. A cam 29, connected to the motor 22, is provided for moving the entire driving mechanism 21 upward and downward, as shown in FIG. 18. That is, the driving mechanism 21 is moved up and down about a pivot 30 by the rotation of the cam 29.

A conveyor 31 is disposed below the driving mechanism 21 so that products cut and formed by the cutting members 1C are received thereon and transported to a subsequent process step. The conveyor 31 may be moved up an down in synchronism with the up-and-down movement of the driving mechanism 21 when products cut from the bar-shaped dough body are received thereon.

Figure 13:
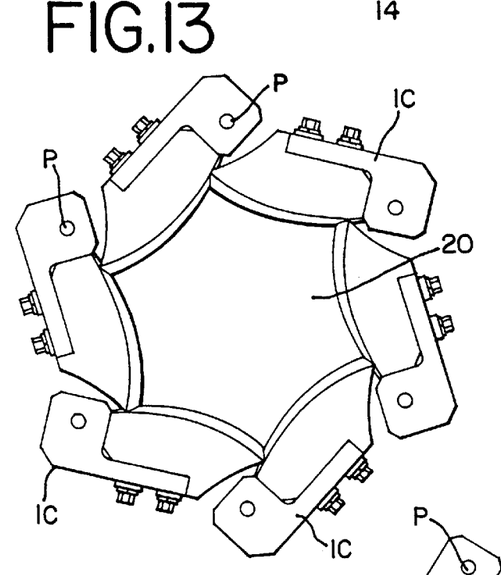
FIG. 13 is a top view showing an assembly of the cutting members of the third embodiment in which the cutting members are in an opened position.
Figure 14:
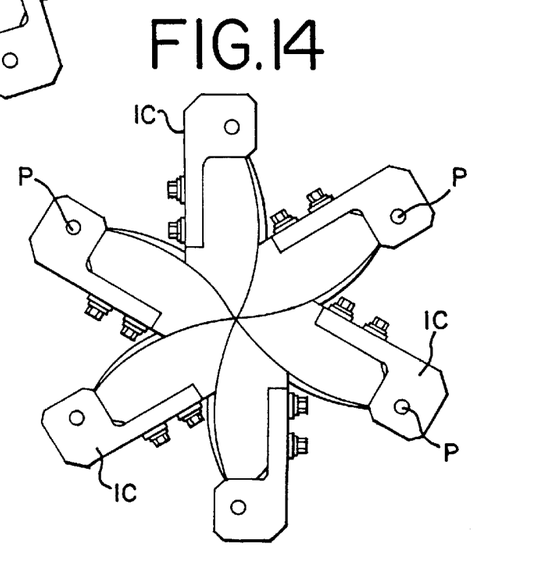
FIG. 14 is a top view showing the assembly of FIG. 13 in which the cutting members are in a closed position.

The effects and operations of the third embodiment will now be described with reference to FIGS. 12–19. In the third embodiment, a closed end of the continuous bar-shaped dough body 2 passes through the opening 20 formed by the cutting members 1C, and is cut and enveloped by pivoting the cutting members 1C to open and close the central opening 20. During the pivoting process, the tip 12 of each cutting member 1C slides along the slanted inner surface 14 of an adjacent cutting member 1C (FIGS. 13 and 14).

Figure 19A:
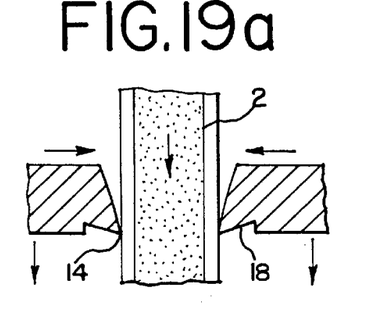
Figure 19B:
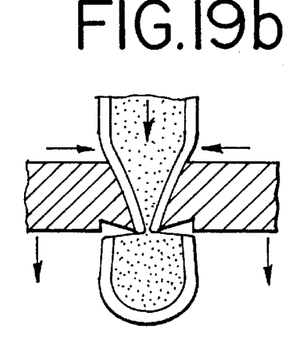
Figure 19C:
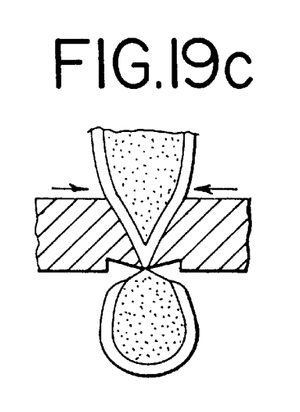
Figure 19D:
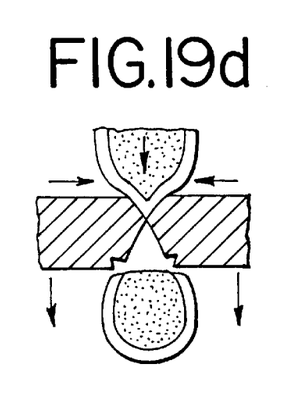
Figure 19E:
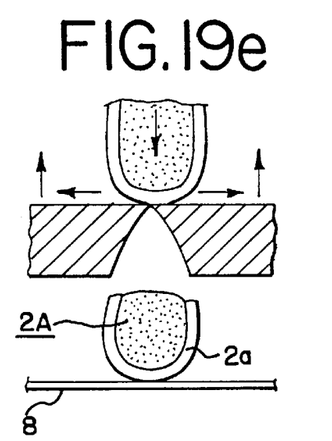

As is shown in FIGS. 19(a) and 19(b), because a groove 18 of a given length extending from the tip 12 along the edge 17 is provided on the lower surface 16 of each cutting member 1C, neatly-cut products 2A can be manufactured. This is because the dough material of the bar-shaped dough 2 is not induced to move toward the fillings. That is, the product is cut by line contact, instead of face contact, since during the cutting process the dough does not touch the lower surface 16. Although the depth of the hollow 18 increases from the edge portion 17 at a given angle, any shape of groove can be used as long as the peripheral dough edge of the cut product does not touch the lower surface 16.

Figure 20:
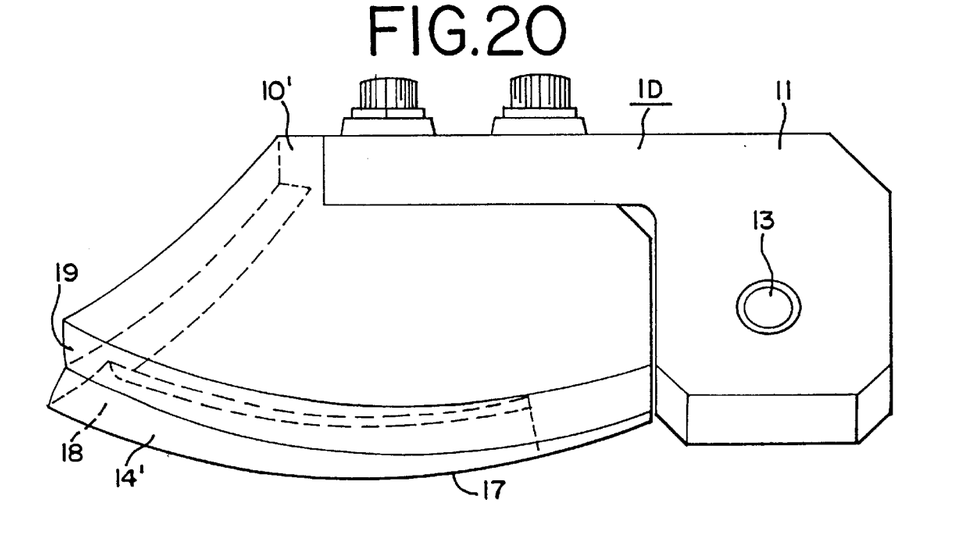
FIG. 20 is a perspective view of a modified cutting member according to the third embodiment.

FIG. 20 shows a modified cutting member 1D in accordance with the third embodiment which is provided to cut a dough body formed from a dough material having a relatively strong viscoelasticity. In this case a substantially vertical pressing surface 19 of a given thickness is provided above a slanted inner surface 14'.

In accordance with the cutting member 1D of the modified third embodiment is shown in FIG. 20, because the cutting member 1D comprises an slanted inner surface 14' meeting the lower surface at a more acute (sharper) angle to form an even sharper edge 17', and a pressing surface 19 of a given thickness extends upward from the slanted inner surface 14', namely, substantially parallel to the bar-shaped dough 2, the cutting member 1D can be used to reliably cut dough material having a stronger viscoelasticity. In other words, because the penetration angle of the edge 17' is almost perpendicular to the bar-shaped dough body 2, it can smoothly penetrate the dough bar 2, so that even a dough material of a strong viscoelasticity can be effectively cut. Further, the cutting member 1D has a hollow 18 on its lower surface, so it can thus neatly cut a product without any dough material adhering to the lower surface.

Moreover, because the pressing surface 19, having strong pressing and constricting actions, is provided as a vertical surface extending above the slanted inner surface 14', the less effective combining and enveloping actions of the slanted inner surface 14' (due to its reduced pressing and constricting actions) can be supplemented by pressing action of the vertical pressing surface 19 for a sticky dough material. Thus, raised-brim products 2A, used widely for various purposes, can be continuously produced by using the above-mentioned structure with improved functions and effects of both cutting the products such that they include an open upper surface, and cutting/enveloping the cut end of the bar-shaped dough body 2, thereby providing an effective apparatus for the mass-production of raised-brim products.

Although in the embodiments above the bar-shaped dough 2 comprises pizza dough and fillings used for a pizza, the present invention is not so limited. Fermented viscoelastic bread dough or viscoelastic pie dough, tart dough, or biscuit dough, each containing oils and fats or other fillings, may also be used as a dough material. Solid food such as fruits or a semi-fluid material such as jam, bean jam or cream may also used as fillings according to the desired products.

As is described above, the present invention provides an apparatus and method for manufacturing raised-brim products using a manufacturing method which is quite different from and much simpler than the conventional method that has been used to date.

The present invention makes it possible to manufacture raised-brim products using apparatus and methods which are much simpler and cheaper compared to the conventional apparatus and methods, described above. That is, as already described, the conventional apparatus merely mechanizes manual manufacturing processes, and needs many forming sub-processes and very delicate controls. Thus, the conventional apparatus results in large-scale expensive means requiring a large manufacturing area. In contrast, the present invention provides a simpler process and apparatus based on a totally different concept. Thus, the apparatus is compact, and is much superior in handling and operation. This inexpensive apparatus enables production of raised-brim products at a substantially lower price.

What is claimed is:

1. A method of manufacturing a raised-brim product comprising the steps of:

feeding an end of a continuous bar-shaped dough body into an opening surrounded by a plurality of movable cutting members, the bar-shaped dough body including a filling material enclosed within a cylindrical dough sheet, wherein each of said plurality of cutting members includes a slanted inner surface and a lower surface which meet at an acute angle to form an edge, and wherein the lower surface defines a concave groove located adjacent to and extending along the edge, and moving the plurality of cutting members such that the edges of the plurality of cutting members cut the bar-shaped dough body to form a separated portion which includes filling material exposed on an upper surface thereof, and such that the slanted inner surface pulls the dough sheet to close the cut end of the bar-shaped dough body.

2. The method according to claim 1, further comprising the step of pressing the upper surface of the separated portion.

3. The method of manufacturing a raised-brim product according to claim 1, wherein the plurality of cutting members are pivotally attached to fulcrums equidistantly disposed in a circular pattern, whereby the opening is opened and closed by pivoting the cutting members.

4. A method of manufacturing a raised-brim product according to claim 2, wherein the plurality of cutting members are pivotally attached to fulcrums equidistantly disposed in a circular pattern, whereby the central opening is opened and closed by pivoting the cutting members.

* * * * *